US012632046B2

(12) United States Patent
Hwang

(10) Patent No.: US 12,632,046 B2
(45) Date of Patent: May 19, 2026

(54) ELECTRONIC DEVICE FOR DETECTING DEFECT AND OPERATION METHOD THEREOF

(71) Applicant: REBELLIONS INC., Seongnam-si (KR)

(72) Inventor: Seok Joong Hwang, Seoul (KR)

(73) Assignee: REBELLIONS INC., Seongnam-si (KR)

( * ) Notice: Subject to any disclaimer, the term of this patent is extended or adjusted under 35 U.S.C. 154(b) by 0 days.

(21) Appl. No.: 19/327,961

(22) Filed: Sep. 12, 2025

(65) Prior Publication Data

US 2026/0010153 A1     Jan. 8, 2026

Related U.S. Application Data

(63) Continuation of application No. PCT/KR2023/003527, filed on Mar. 16, 2023.

(30) Foreign Application Priority Data

Mar. 13, 2023     (KR) ........................ 10-2023-0032509

(51) Int. Cl.
*G05B 23/02*          (2006.01)
(52) U.S. Cl.
CPC ..... *G05B 23/0237* (2013.01); *G05B 23/0235* (2013.01)
(58) Field of Classification Search
CPC ........................ G05B 23/0237; G05B 23/0235
See application file for complete search history.

(56) References Cited

U.S. PATENT DOCUMENTS

| | | | | |
|---|---|---|---|---|
| 5,325,517 A | * | 6/1994 | Baker | G06F 11/1641 |
| | | | | 714/E11.015 |
| 8,635,492 B2 | * | 1/2014 | Gara | G06F 11/1658 |
| | | | | 714/11 |
| 9,325,449 B2 | | 4/2016 | Birrittella | |

(Continued)

FOREIGN PATENT DOCUMENTS

KR     10-2016-0068857 A     6/2016

OTHER PUBLICATIONS

International Search Report for PCT/KR2023/003527 by Korean Intellectual Property Office dated Nov. 30, 2023.

*Primary Examiner* — Catherine T. Rastovski
*Assistant Examiner* — Michael J Singletary
(74) *Attorney, Agent, or Firm* — BROADVIEW IP LAW, PC

(57)          ABSTRACT

The present disclosure relates to an electronic device for performing a defect detection and an operation method thereof, and an operation method of an electronic device including a plurality of processing lanes and at least one additional processing lane according to an example embodiment of the present disclosure includes identifying a lane group including lanes to process identical input data among a plurality of lanes including the plurality of processing lanes and the at least one additional processing lane, identifying, for each of a plurality of lane groups, comparison result data indicating a result of comparison between processing result data of lanes included in each lane group, and detecting whether a defect occurs for at least one of the plurality of lanes based on the comparison result data of the plurality of lane groups.

14 Claims, 11 Drawing Sheets

(56) References Cited

U.S. PATENT DOCUMENTS

| 11,263,073 | B2 * | 3/2022 | Boettcher | G06F 11/165 |
| 11,340,960 | B2 * | 5/2022 | Santoni | G06F 9/52 |
| 2012/0089861 | A1 * | 4/2012 | Cardinell | G06F 11/0757 |
| | | | | 714/E11.003 |
| 2012/0113271 | A1 * | 5/2012 | Haraguchi | G06F 9/3861 |
| | | | | 712/E9.023 |
| 2015/0163014 | A1 * | 6/2015 | Birrittella | H04L 1/1874 |
| | | | | 714/807 |
| 2016/0283430 | A1 * | 9/2016 | Ueda | H04N 19/423 |
| 2021/0117269 | A1 * | 4/2021 | Kalamatianos | G06F 11/1629 |
| 2022/0283619 | A1 * | 9/2022 | Rotem | G06F 1/324 |

* cited by examiner

ELECTRONIC DEVICE FOR DETECTING DEFECT AND OPERATION METHOD THEREOF

CROSS-REFERENCE TO RELATED APPLICATION

This application is a continuation of pending PCT International Application No. PCT/KR2023/003527, filed on Mar. 16, 2023, which claims priority to Korean Patent Application No. 10-2023-0032509 filed on Mar. 13, 2023, the entire contents of which are hereby incorporated by references in its entirety.

TECHNICAL FIELD

The present disclosure relates to an electronic device for performing a defect detection and an operation method thereof, and more particularly, the present disclosure relates to an electronic device for detecting a defect occurring in the electronic device and responding thereto and an operation method thereof.

BACKGROUND ART

A system semiconductor is used to control and operate an electronic device, and is gaining attention as an essential component of Fourth Industrial Revolution technologies such as the Internet of Things (IoT), artificial intelligence (AI), and autonomous driving. The system semiconductor may include a processor that performs various calculations, controls, and information processing, and research on a method for detecting internal defects is being conducted to ensure the stability of the electronic device that uses the system semiconductor.

To detect a defect in the electronic device without needing to use a separate defect detection device, a built-in self-test method using a scan chain in logic has been proposed. However, such method may not use logic during defect detection testing, which degrades the performance of the electronic device, and may increase power consumption because multiple logics are activated simultaneously. In addition, there has also been proposed a method to detect a defect by executing test workloads at regular intervals and comparing with golden references. However, this method has an issue of not being able to use logic during testing, which degrades the performance of the electronic device and makes it difficult to secure workloads with high test coverage.

DETAILED DESCRIPTION OF THE INVENTION

Technical Goals

To solve the above issues, the present disclosure provides an electronic device for detecting a defect occurring in the electronic device without needing to use a separate defect detection device and an operation method thereof.

Further, the present disclosure provides an electronic device for responding to a detected defect without a degradation in performance of the electronic device and an operation method thereof.

The technical goals to be achieved by example embodiments of the present disclosure are not limited to the technical goals described above, and other technical goals can be inferred from the following example embodiments.

Technical Solutions

According to an example embodiment of the present disclosure, there is provided an operation method of an electronic device including a plurality of processing lanes and at least one additional processing lane, the operation method including identifying a lane group including lanes to process identical input data among a plurality of lanes including the plurality of processing lanes and the at least one additional processing lane, identifying, for each of a plurality of lane groups, comparison result data indicating a result of comparison between processing result data of lanes included in each lane group, and detecting whether a defect occurs for at least one of the plurality of lanes based on the comparison result data of the plurality of lane groups.

For example, the identifying of the lane group may include identifying a first lane group to process first input data through an N-th lane group to process N-th input data, N being a natural number greater than or equal to "2."

For example, the N may be set to correspond to a number of the plurality of processing lanes, and a number of lanes included in each of the plurality of lane groups may be set to correspond to a number of the at least one additional processing lane.

For example, the identifying of the comparison result data for each of a plurality of lane groups may include controlling first input data to be input to each of lanes included in a first lane group and controlling second input data to be input to each of lanes included in a second lane group based on a processing progress status of the lanes included in the first lane group.

For example, the plurality of lane groups may include a first lane group and a second lane group, the first lane group may include a first lane and a second lane, the second lane group may include the second lane and a third lane, and wherein the detecting of whether the defect occurs for at least one of the plurality of lanes may include determining whether a defect occurs for at least one of the first lane, the second lane, and the third lane based on first comparison result data on the first lane group and second comparison result data on the second lane group.

For example, the comparison result data may have a first value when lanes included in the each lane group have identical processing result data and a second value when the lanes included in the each lane group have different processing result data, and wherein the detecting of whether the defect occurs for at least one of the plurality of lanes may include when comparison result data has the second value, increasing a counter value of each of lanes corresponding to the comparison result data and identifying a lane having the counter value greater than or equal to a threshold value to be a lane in which a defect occurs.

For example, the operation method may further include controlling the lane in which the defect occurs to be deactivated and controlling input data to be processed by lanes aside from the lane in which the defect occurs among the plurality of lanes.

For example, the electronic device may identify a counter value corresponding to each of the plurality of lanes according to a set period.

For example, the electronic device may be one of a single instruction multiple data (SIMD) processor and a single instruction multiple thread (SIMT) processor.

According to an example embodiment of the present disclosure, there is also provided an electronic device including a plurality of processing lanes, at least one additional processing lane, and a controller, wherein the controller is configured to identify a lane group including lanes to process identical input data among a plurality of lanes including the plurality of processing lanes and the at least one additional processing lane, identify, for each of a plurality of lane groups, comparison result data indicating a result of comparison between processing result data of lanes included in each lane group, and detect whether a defect occurs for at least one of the plurality of lanes based on the comparison result data of the plurality of lane groups.

For example, the electronic device may further include an input selection circuit configured to select input data to be input to each of the plurality of lanes among a plurality of input data and an output selection circuit configured to output comparison result data of the plurality of lane groups and select a plurality of output data corresponding to the plurality of input data among processing result data of the plurality of lanes.

For example, the input selection circuit may include a first multiplexer configured to select input data to be identically input to each of lanes included in each lane group, and wherein the output selection circuit may include a comparator configured to compare processing result data of lanes included in each lane group and a second multiplexer configured to select output data from processing result data of lanes included in each lane group.

For example, the electronic device may further include a counter corresponding to each of the plurality of lanes, wherein the comparison result data may have a first value when lanes included in the each lane group have identical processing result data and may have a second value when the lanes included in the each lane group have different processing result data, and wherein the controller may, when comparison result data has the second value, increase a counter value of a counter corresponding to each of lanes corresponding to the comparison result data and identify a lane having the counter value greater than or equal to a threshold value to be a lane in which a defect occurs.

For example, the electronic device may further include an output part configured to output a signal indicating a defect occurrence when a defect is detected for at least one of the plurality of lanes.

According to an example embodiment of the present disclosure, there is also provided a non-transitory computer-readable recording medium including a program for performing the above-described operation method on a computer.

Details of other example embodiments are included in the following detailed description and the accompanying drawings.

Effects of the Invention

According to an example embodiment of the present disclosure, an electronic device is implemented to include at least one additional processing lane for processing input data and thus, it is possible to operate the electronic device without a degradation in performance while a test operation for defect detection is performed, and also possible to minimize issues of increased hardware area and power consumption.

Further, according to an example embodiment of the present disclosure, an electronic device may maintain performance and stability by performing data processing using an additional processing lane instead of a processing lane in which a defect is detected.

Effects of the present disclosure are not limited to those described above and other effects may be made apparent to those skilled in the art from the following description.

MODE FOR CARRYING OUT THE INVENTION

Figure 1:
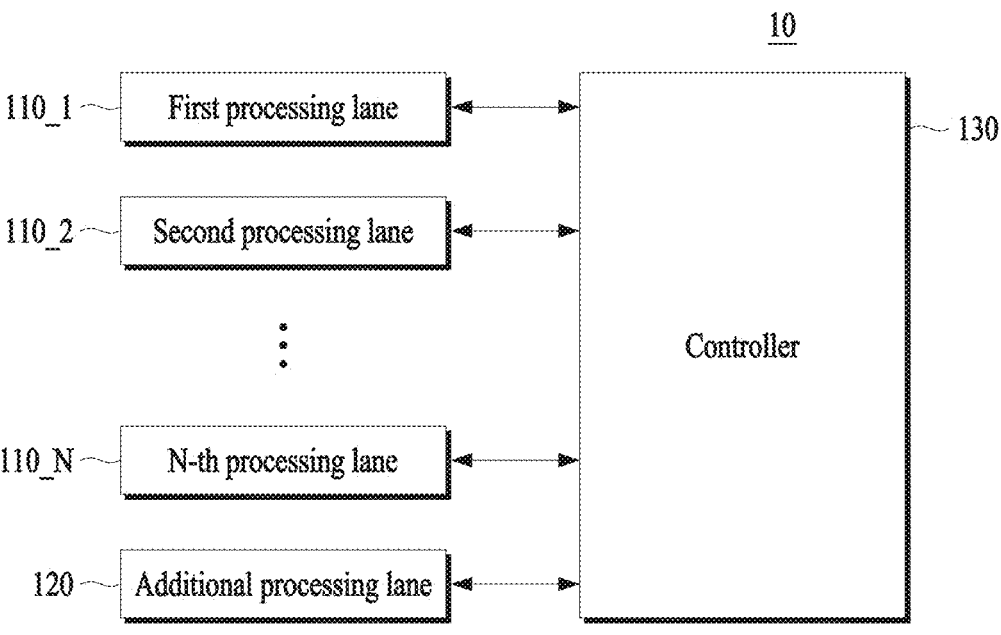
FIG. 1 is a block diagram illustrating an electronic device according to an example embodiment of the present disclosure.

Terms used in the example embodiments are selected, as much as possible, from general terms that are widely used at present while taking into consideration the functions obtained in accordance with the present disclosure, but these terms may be replaced by other terms based on intentions of those skilled in the art, customs, emergence of new technologies, or the like. Also, in a particular case, terms that are arbitrarily selected by the applicant of the present disclosure may be used. In this case, the meanings of these terms may be described in corresponding description parts of the disclosure. Accordingly, it should be noted that the terms used herein should be construed based on practical meanings thereof and the whole content of this specification, rather than being simply construed based on names of the terms.

In the entire specification, when an element is referred to as "including" another element, the element should not be understood as excluding other elements so long as there is no special conflicting description, and the element may include at least one other element. In addition, the terms "part", "module", and "unit", for example, may refer to a component that exerts at least one function or operation, and may be realized in hardware or software, or may be realized by combination of hardware and software.

According to an example embodiment of the present disclosure, an electronic device may be a device that performs various operations, controls, information processing, and the like. The electronic device according to an example embodiment of the present disclosure may include a plurality of processing units that perform parallel computing, and a processing unit may indicate a single unit that performs various operations, controls, and information processing. In this specification, the electronic device will be described based on a structure of a single instruction multiple data (SIMD) processor, but this is merely an example to help understand the present disclosure and does not limit the type of electronic device according to the present disclosure. For example, the electronic device according to an example embodiment of the present disclosure may be any one of various electronic devices including a SIMD processor, and a multiprocessor in which a single instruction multiple thread (SIMT) processor and multiple processors are integrated. In other words, the electronic device according to an example embodiment of the present disclosure may be any electronic device including a configuration that performs parallel computing through a plurality of processing units.

In this specification, when describing an electronic device based on the structure of the SIMD processor, the term "processing lane" will be understood as a concept corresponding to a processing unit. Meanwhile, according to an example embodiment of the present disclosure, when an electronic device is implemented as a multi-processor, one processor can be understood as a concept corresponding to a processing unit. Additionally, the term "additional processing lane" as described herein may indicate a configuration that performs substantially the same operations as a processing lane, and may be understood as a term used to distinguish from a processing lane included in an electronic device for ease of description. The term "a plurality of lanes" described in this specification may be understood as a concept including the processing lane and the additional processing lane described above.

In the following description, example embodiments of the present disclosure will be described in detail with reference to the drawings so that those skilled in the art can easily carry out the present disclosure. The present disclosure may be embodied in many different forms and is not limited to the embodiments described herein.

FIG. 1 is a block diagram illustrating an electronic device 10 according to an example embodiment of the present disclosure. Referring to FIG. 1, the electronic device 10 according to an example embodiment may include first to N-th processing lanes 110_1, 110_2, . . . , and 110_N, an additional processing lane 120, and a controller 130.

Each of the first to N-th processing lanes 110_1, 110_2, . . . , and 110_N may perform an operation corresponding to input data and output processing result data derived through the operation. In the example embodiment, the first to N-th processing lanes 110_1, 110_2, . . . , and 110_N may be synchronized to perform operations corresponding to commands, and physical or logical circuits for performing operations in the first to N-th processing lanes 110_1, 110_2, . . . , and 110_N may have identical structures. The first to N-th processing lanes 110_1, 110_2, . . . , and 110_N may perform computational operations on input data inputted to the first to N-th processing lanes 110_1, 110_2, . . . , and 110_N in parallel based on commands.

The additional processing lane 120 may perform an operation corresponding to input data and output processing result data derived through the operation. The additional processing lane 120 may also be synchronized with the first to N-th processing lanes 110_1, 110_2, and 110_N to perform an operation corresponding to a command, and may perform a computational operation on input data in parallel with the first to N-th processing lanes 110_1, 110_2, . . . , and 110_N. In this specification, the electronic device 10 including one additional processing lane 120 is described for ease of explanation. However, this is merely an example embodiment of the present disclosure, and the description of such does not limit a configuration of the electronic device 10 according to the present disclosure. Specifically, the electronic device 10 according to an example embodiment of the present disclosure may include a plurality of additional processing lanes. When an electronic device 10 includes the plurality of additional processing lanes, each of the plurality of additional processing lanes may perform a computational operation on input data corresponding to each of the plurality of additional processing lanes in parallel with the first to N-th processing lanes 110_1, 110_2, . . . , and 110_N. Meanwhile, a physical or logical circuit for performing an operation in each of the plurality of additional processing lanes may have the same structure as that of the processing lane 110_1, 110_2, . . . , or 110_N.

Meanwhile, in this specification, the plurality of lanes 110_1, 110_2, . . . , 110_N, and 120 arranged in one row or column is described. The description of such is only for ease of explanation and does not limit an arrangement of the plurality of lanes 110_1, 110_2, . . . , 110_N, and 120. A configuration and an arrangement of the plurality of lanes 110_1, 110_2, . . . , 110_N, and 120 according to an example embodiment of the present disclosure will be described in detail with reference to FIG. 2A and FIG. 2B below.

The controller 130 may control an operation of the plurality of lanes 110_1, 110_2, . . . , 110_N, and 120. The controller 130 may be connected to each of the plurality of lanes 110_1, 110_2, . . . , 110_N, and 120 via an internal bus, and the controller 130 may transmit signals for controlling the operation of the plurality of lanes 110_1, 110_2, . . . , 110_N, and 120 included in the electronic device 10 via the internal bus. The controller 130 may decode a command stored in a memory (not shown) and generate control signals for the plurality of lanes 110_1, 110_2, . . . , 110_N, and 120. In the example embodiment, the control signals may include at least a portion of a first control signal for instructing execution of an operation for each of the plurality of lanes 110_1, 110_2, . . . , 110_N, and 120 and a second control signal for controlling activation of each of the plurality of lanes 110_1, 110_2, . . . , 110_N, and 120.

The electronic device 10 according to an example embodiment of the present disclosure may identify a lane group including lanes to process identical input data among the plurality of lanes 110_1, 110_2, . . . , 110_N, and 120. A number of lanes included in the lane group may be two or more, and a classification reference for identifying the lane group may follow a set reference. For example, when a lane group classification reference is set to identify two physically adjacent lanes as one lane group, a first lane group may include a first lane and a second lane that is physically adjacent to the first lane, and a second lane group may include the second lane and a third lane that is physically adjacent to the second lane. In some example embodiment, a number of lane groups identified by the electronic device 10 may be set to correspond to a number of the processing lanes 110_1, 110_2, . . . , and 110_N, and a number of lanes included in a lane group may be set to correspond to a number of the additional processing lanes 120. However, the number of lanes included in the lane group and the number of lane groups identified according to an example embodiment of the present disclosure are not limited thereto.

The electronic device 10 according to an example embodiment of the present disclosure may determine whether an error occurs in one lane group through a test operation to compare processing result data derived from lanes included in the one lane group. Specifically, when all lanes included in one lane group are in a normal state, identical data may be input to synchronized lanes, so identical processing result data may be derived from the lanes. Meanwhile, when a defect occurs in at least one of the lanes included in the one lane group, at least one of the processing result data derived from the lanes may have a different result value even if the identical data is input to each of the synchronized lanes. The electronic device 10 may cyclically determine whether an error occurs for each of a plurality of lane groups identified from the electronic device 10, and based on whether an error has occurred for each of the plurality of lane groups, may determine whether a defect occurs for at least one of the plurality of lanes 110_1, 110_2, . . . , 110_N, and 120 included in the electronic device 10.

Meanwhile, although not shown in FIG. 1, the electronic device 10 according to some example embodiments of the present disclosure may further include a counter (not shown) corresponding to each of the plurality of lanes 110_1, 110_2, . . . , 110_N, and 120, and the counter corresponding to each of the plurality of lanes 110_1, 110_2, . . . , 110_N, and 120 may record a counter value indicating a defect occurrence possibility. Specifically, when an error is identified in a test operation for one lane group, the electronic device 10 may determine that at least one of lanes included in the one lane group has a defect occurrence possibility, and may increase a counter value corresponding to each of the lanes. In addition, when a defect is detected in at least one of the plurality of lanes 110_1, 110_2, . . . , 110_N, and 120, the electronic device 10 according to some example embodiment of the present disclosure may further include an output part (not shown) to externally output a signal indicating that a defect occurs.

According to an example embodiment of the present disclosure, since the electronic device 10 includes the additional processing lane 120, even if a test operation for defect detection is performed, a degradation in performance of the electronic device 10 to be exhibited through the first to N-th processing lanes 110_1, 110_2, . . . , and 110_N may not occur. For example, when the electronic device 10 is configured to include the first to fourth processing lanes 110_1, 110_2, 110_3, and 110_4 and one additional processing lane 120, and when the number of lanes included in the lane group identified by the electronic device 10 is set to be two, even during a test operation performed to determine whether an error occurs for the lane group, the performance of the electronic device 10 to be exhibited through the first to fourth processing lanes 110_1, 110_2, 110_3, and 110_4 may be maintained.

In addition, the electronic device 10 according to an example embodiment of the present disclosure may perform a defect response operation by deactivating a lane in which a defect occurs, and through the defect response operation, prevent data processing errors, which may be caused by the lane in which a defect occurs. For example, when the electronic device 10 includes the first to fourth processing lanes 110_1, 110_2, 110_3, and 110_4 and one additional processing lane 120, and when a defect is detected in the first processing lane 110_1, the controller 130 may deactivate the first processing lane 110_1, and the electronic device 10 may process data through the second to fourth processing lanes 110_2, 110_3, and 110_4 and the additional processing lane 120. Through this, a desired performance to be exhibited through the first to fourth processing lanes 110_1, 110_2, 110_3, and 110_4 may be maintained, and the stability may also be maintained. Meanwhile, unlike a defect detection method in which defect detection is performed in a lockstep manner by fully redundantizing the entire hardware (i.e., full redundancy), the electronic device 10 according to an example embodiment of the present disclosure may perform parallel processing on identical input data by adding the additional processing lane 120 (i.e., partial redundancy), which may minimize issues of increased area and power consumption due to hardware redundancy.

Figure 2A:
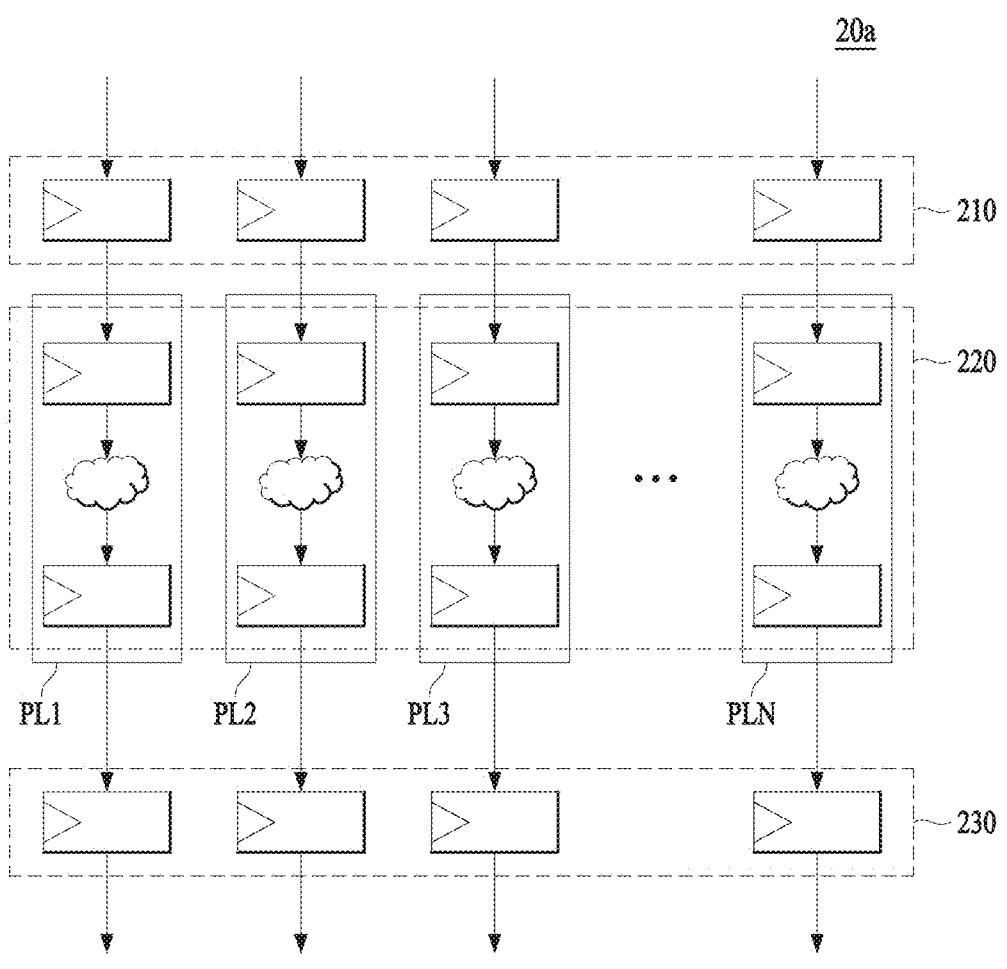
FIG. 2A and FIG. 2B are diagrams for comparatively describing an operation of an electronic device according to an example embodiment of the present disclosure.
Figure 2B:
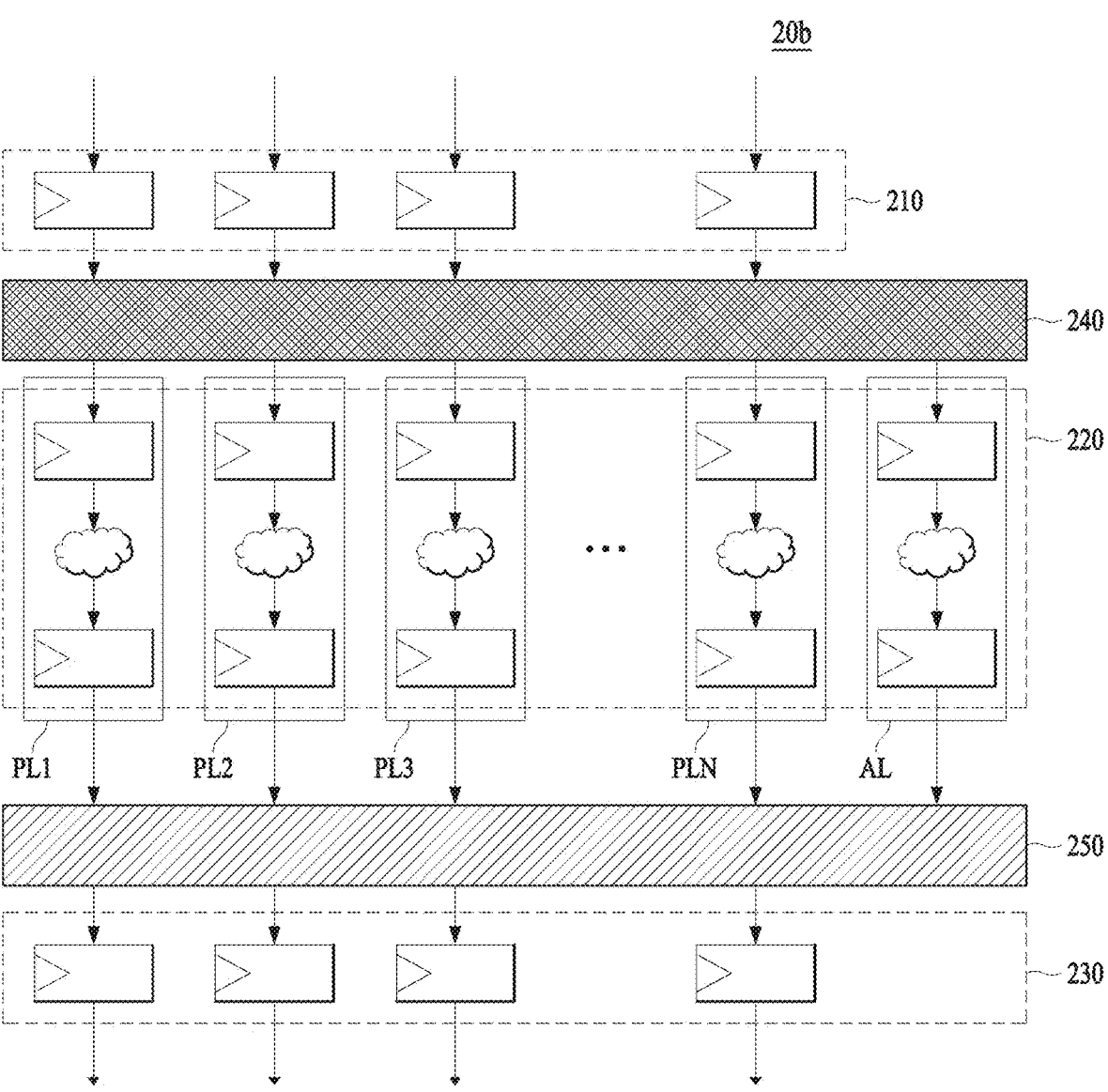

FIG. 2A and FIG. 2B are diagrams for comparatively describing an operation of an electronic device 20b according to an example embodiment of the present disclosure. FIG. 2A is a diagram illustrating an operation of an electronic device 20a that generally performs parallel operation, and FIG. 2B is a diagram illustrating an operation of the electronic device 20b including an additional processing lane AL according to an example embodiment of the present disclosure.

Referring to FIG. 2A, the electronic device 20a generally performing parallel operation may include an operand input part 210, a data processing part 220, and a data output part 230. The data processing part 220 may include a plurality of processing lanes PL1, PL2, . . . , and PLN.

The operand input part 210 may receive input data acquired from a memory by the controller 130. The operand input part 210 may include a flip-flop corresponding to each of the plurality of processing lanes PL1, PL2, . . . , and PLN, and a plurality of flip-flops included in the operand input part 210 may correspond to a register. The operand input part 210 may load input data to be input to each of the plurality of processing lanes PL1, PL2, . . . , and PLN and transmit the loaded input data to each of the plurality of processing lanes PL1, PL2, . . . , and PLN to perform data processing corresponding to a command.

Each of the plurality of processing lanes PL1, PL2, . . . , and PLN may process the input data input to correspond to the command and derive processing result data. Each of the plurality of processing lanes PL1, PL2, . . . , and PLN may include a first flip-flop that loads input data, a logic circuit for performing an operation corresponding to the command, and a second flip-flop that loads processing result data corresponding to the command, and the logic circuit included in each of the plurality of processing lanes PL1, PL2, . . . , and PLN may be configured to perform operation processing corresponding to the command and synchronized to correspond to a mutual command.

The data output part 230 may output the processing result data derived from each of the plurality of processing lanes PL1, PL2, . . . , and PLN. The data output part 230 may include a flip-flop corresponding to each of the plurality of processing lanes PL1, PL2, . . . , and PLN, and a plurality of flip-flops included in the data output part 230 may correspond to a register.

Referring to FIG. 2B, the electronic device 20b according to an example embodiment of the present disclosure may further include an input selection circuit 240 and an output selection circuit 250 in addition to the operand input part 210, the data processing part 220, and the data output part 230. The operand input part 210, the data processing part 220, and the data output part 230 included in the electronic device 20b according to an example embodiment of the present disclosure may perform operations identical to operations performed by the operand input part 210, the data processing part 220, and the data output part 230 included in the electronic device 20*a* generally performing parallel operation, and descriptions of such will be omitted.

According to an example embodiment of the present disclosure, the input selection circuit 240 may select input data provided from the operand input part 210. Specifically, the input selection circuit 240 according to an example embodiment of the present disclosure may select input data transmitted from the operand input part 210 to input identical input data to lanes included in one lane group for detecting a defect occurring in the plurality of lanes PL1, PL2, . . . , PLN, and AL included in the electronic device 20*b*, and may transmit the selected input data to each of the plurality of lanes PL1, PL2, . . . , PLN, and AL. For example, when the electronic device 20*b* includes the first to fourth processing lanes PL1, PL2, PL3, and PL4 and the additional processing lane AL, receives first to fourth input data from the operand input part 210, and performs a test operation to determine whether an error occurs for a lane group including the first and second processing lanes PL1 and PL2, the input selection circuit 240 may transmit first input data to each of the first and second processing lane PL1 and PL2, transmit second input data to the third processing lane PL3, transmit the third input data to the fourth processing lane PL4, and transmit the fourth input data to the additional processing lane AL.

Meanwhile, the output selection circuit 250 may select processing result data derived from the plurality of lanes PL1, PL2, . . . , PLN, and AL. For example, when the electronic device 20*b* includes the first to fourth processing lanes PL1, PL2, PL3, and PL4, and the additional processing lane Al and performs a test operation to determine whether an error occurs for the lane group including the first and second processing lanes PL1 and PL2, the output selection circuit 250 may select one of first processing result data derived from the first processing lane PL1 to correspond to the first input data and second processing result data derived from the second processing lane PL2 to corresponding to the first input data, third processing result data derived from the third processing lane PL3 to correspond to the second input data, fourth processing result data derived from the fourth processing lane PL4 to correspond to the third input data, and fifth processing result data derived from the additional processing lane AL to correspond to the fourth input data, and transmit the selected processing result data to the data output part 230.

In addition, the output selection circuit 250 may derive comparison result data by comparing processing result data derived from lanes included in a lane group. For example, when a lane group includes the first and second processing lanes PL1 and PL2, the output selection circuit 250 may compare the first processing result data derived from the first processing lane PL1 to correspond to the first input data and the second processing result data derived from the second processing lane PL2 to correspond to the first input data. When the first processing result data matches the second processing result data, the output selection circuit 250 may derive comparison result data having a first value for the lane group. When the first processing result data does not match the second processing result data, the output selection circuit 250 may derive comparison result data having a second value for the lane group.

The above-described physical or logical structures of the input selection circuit 240 and the output selection circuit 250 may have any structure for selecting input data for each of the plurality of lanes PL1, PL2, . . . , PLN, and AL and processing result data derived from each of the plurality of lanes PL1, PL2, . . . , PLN, and AL. The structures of the input selection circuit 240 and the output selection circuit 250 according to an example embodiment will be described in detail with reference to FIG. 4 and FIG. 6.

Figure 3:
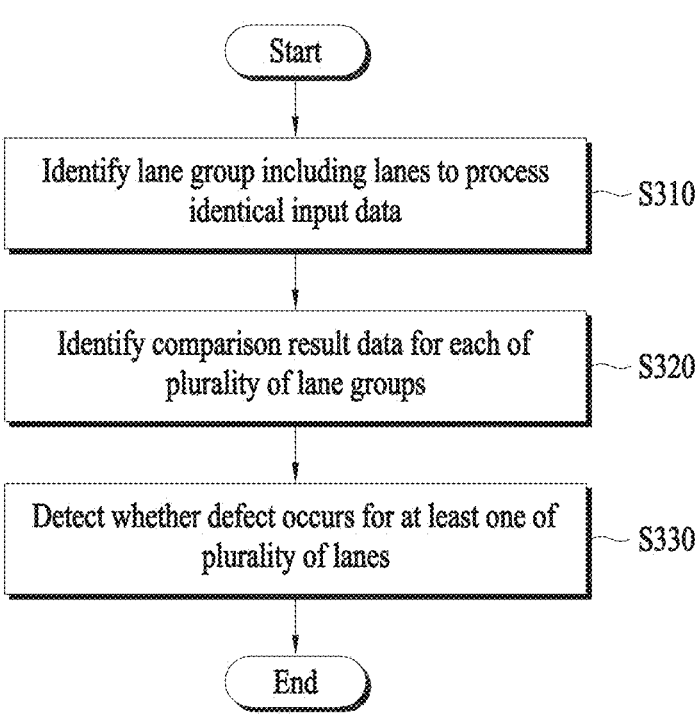
FIG. 3 is a flowchart illustrating an operation method of an electronic device for defect detection according to an example embodiment of the present disclosure.

FIG. 3 is a flowchart illustrating a method of operating the electronic device 10 (referring to FIG. 1) for defect detection according to an example embodiment of the present disclosure.

In operation S310, the electronic device 10 according to an example embodiment of the present disclosure may identify a lane group including lanes to process identical input data among the plurality of lanes 110_1, 110_2, . . . , 110_N, and 120 included in the electronic device 10. As described above, in some example embodiments, a number of lane groups identified by the electronic device 10 may be set to correspond to a number of the plurality of processing lanes 110_1, 110_2, . . . , and 110_N, and a number of lanes included in the lane group may be set to correspond to a number of the additional processing lanes 120. According to an example embodiment of the present disclosure, a structure of the electronic device 10 may be implemented so that the lanes included in the lane group may receive identical input data.

For example, when the electronic device 10 includes the first to fourth processing lanes 110_1, 110_2, 110_3, and 110_4, and the additional processing lane 120, the electronic device 10 may identify first to fourth lane groups, and each of the first to fourth lane groups may include two lanes. In this case, the electronic device 10 may identify the first lane group including the first and second processing lanes 110_1 and 110_2, the second lane group including the second and third processing lanes 110_2 and 110_3, the third lane group including the third and fourth processing lanes 110_3 and 110_4, and the fourth lane group including the fourth processing lane 110_4 and the additional processing lane 120.

Meanwhile, in some example embodiments, when a structure of the electronic device 10 is implemented so that the additional processing lane 120 may receive the identical input data as each of the first processing lane 110_1 and the N-th processing lane 110_N, the electronic device 10 may identify the first lane group including the first and second processing lanes 110_1 and 110_2, the second lane group including the second and third processing lanes 110_2 and 110_3, the third lane group including the third and fourth processing lanes 110_3 and 110_4, the fourth lane group including the fourth processing lane 110_4 and the additional processing lane 120, and a fifth lane group including the additional processing lane 120 and the first processing lane 110_1.

In other example embodiments, when the electronic device 10 includes the first to fourth processing lanes 110_1, 110_2, 110_3, and 110_4 and first and second additional processing lanes, a number of lanes included in each lane group may be set to three, and the electronic device 10 may identify the first lane group including the first to third processing lanes 110_1, 110_2, and 110_3, the second lane group including the second to fourth processing lanes 110_2, 110_3, and 110_4, the third lane group including the third and fourth processing lanes 110_3 and 110_4 and the first additional processing lane, and the fourth lane group including the fourth processing lane 110_4 and the first and second additional processing lanes. A method of identifying a lane group according to an example embodiment of the present disclosure is not limited to the method according to the aforementioned example, and a lane group may be identified according to any method that allows the number of lanes included in each lane group to be the same and allows the identical input data to be provided for lanes included in each lane group.

In operation S320, the electronic device 10 may identify comparison result data for each of the plurality of lane groups identified in operation S310. The comparison result data may be derived by comparing processing result data derived from lanes included in each lane group. For example, for a lane group including the first and second processing lanes 110_1 and 110_2, the electronic device 10 may compare first processing result data derived from the first processing lane 110_1 to correspond to first input data and second processing result data derived from the second processing lane 110_2 to correspond to the first input data. In the example embodiment, when processing result data derived from the lanes included in the lane group match, the comparison result data may have a first value, and when processing result data derived from the lanes included in the lane group do not match, the comparison result data may have a second value.

The electronic device 10 according to an example embodiment of the present disclosure may perform operation S320 cyclically for the plurality of lane groups identified by the electronic device 10. For example, when the first to fourth lane groups are identified by the electronic device 10, the electronic device 10 may sequentially perform test operations for the first lane group through the fourth lane group. In other words, the electronic device 10 may perform a test operation for the second lane group by controlling the data processing unit 220 (refer to FIG. 2B) to input the input data for the second lane group based on a processing progress status of the lanes included in the first lane group. The processing progress status may refer to a data processing progress status in the plurality of lanes 110_1, 110_2, . . . , 110_N, and 120 (refer to FIG. 1) included in the electronic device 10 corresponding to one command. In the example embodiment, the processing progress status for one lane group may be identified based on a command.

In operation S330, the electronic device 10 may detect whether a defect occurs for at least one of the plurality of lanes 110_1, 110_2, . . . , 110_N, and 120 included in the electronic device 10 based on the comparison result data. Specifically, the electronic device 10 may identify a defect occurrence possibility for each lane group based on the comparison result data for each lane group identified in operation S320 and determine a lane having a defect by integrating the defect occurrence possibility identified for each lane group. A method of detecting whether a defect occurs for at least one of the plurality of lanes 110_1, 110_2, . . . , 110_N, and 120 will be described in detail with reference to FIG. 4 below.

Figure 4:
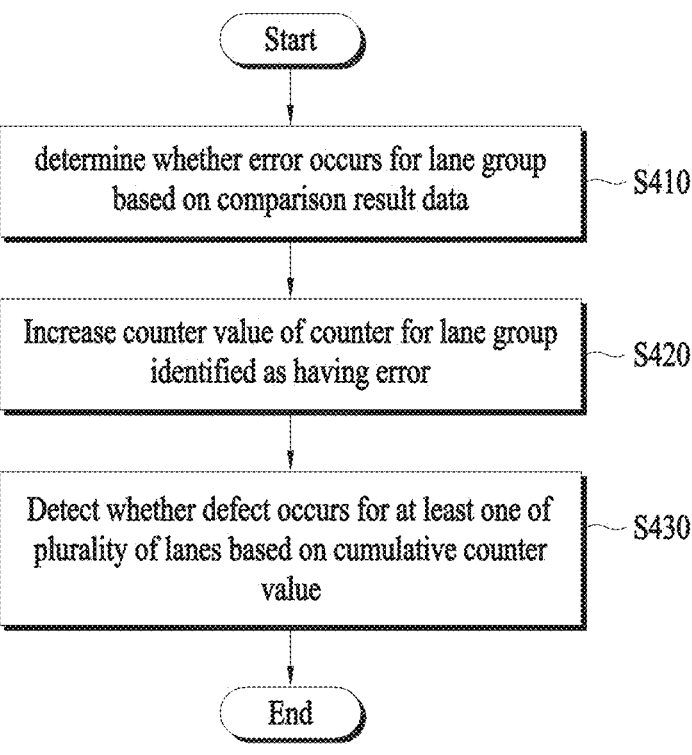
FIG. 4 is a flowchart illustrating a method of detecting a defect occurrence for at least one of a plurality of lanes in detail according to some example embodiments of the present disclosure.

FIG. 4 is a flowchart illustrating a method of detecting whether a defect occurs for at least one of the plurality of lanes 110_1, 110_2, . . . , 110_N, and 120 (refer to FIG. 1) according to some example embodiments of the present disclosure.

In operation S410, the electronic device 10 (refer to FIG. 1) according to an example embodiment of the present disclosure may determine whether an error occurs for a lane group based on comparison result data identified for each lane group in operation S320 of FIG. 3. For example, when comparison result data for the lane group including the first and second processing lanes 110_1 and 110_2 has a first value, the electronic device 10 may identify that an error does not occur in the first and second processing lanes 110_1 and 110_2, and comparison result data for the lane group including the first and second processing lanes 110_1 and 110_2 has a second value, the electronic device 10 may identify that an error occurs in the lane group including the first and second processing lanes 110_1 and 110_2.

In operation S420, the electronic device 10 may increase a counter value of a counter corresponding to each of lanes included in the lane group identified as having an error. Specifically, the electronic device 10 may determine that the error occurs due to a defect occurring for at least one of the lanes included in the lane group, and because a lane having the defect is not to be determined among the lanes included in the lane group based on the comparison result data, may increase a counter value for representing a defect occurrence possibility for the lanes included in the lane group identified as having the error. In the example embodiment, when the electronic device 10 repetitively performs an operation of determining whether an error occurs for the plurality of lane groups, the counter value corresponding to each of the plurality of lanes 110_1, 110_2, . . . , 110_N, and 120 may be accumulated.

In operation S430, the electronic device 10 may detect whether a defect occurs for at least one of the plurality of lanes 110_1, 110_2, . . . , 110_N, and 120 based on a cumulative counter value corresponding to each of the plurality of lanes 110_1, 110_2, . . . , 110_N, and 120. Specifically, the electronic device 10 may determine whether the counter value of the counter corresponding to each of the plurality of lanes 110_1, 110_2, . . . , 110_N, and 120 is greater than a threshold value, and when a counter value corresponding to a predetermined lane is greater than the threshold value, may identify that a defect occurs in the corresponding lane. The threshold value may be set for the electronic device 10 in advance.

Figure 5:
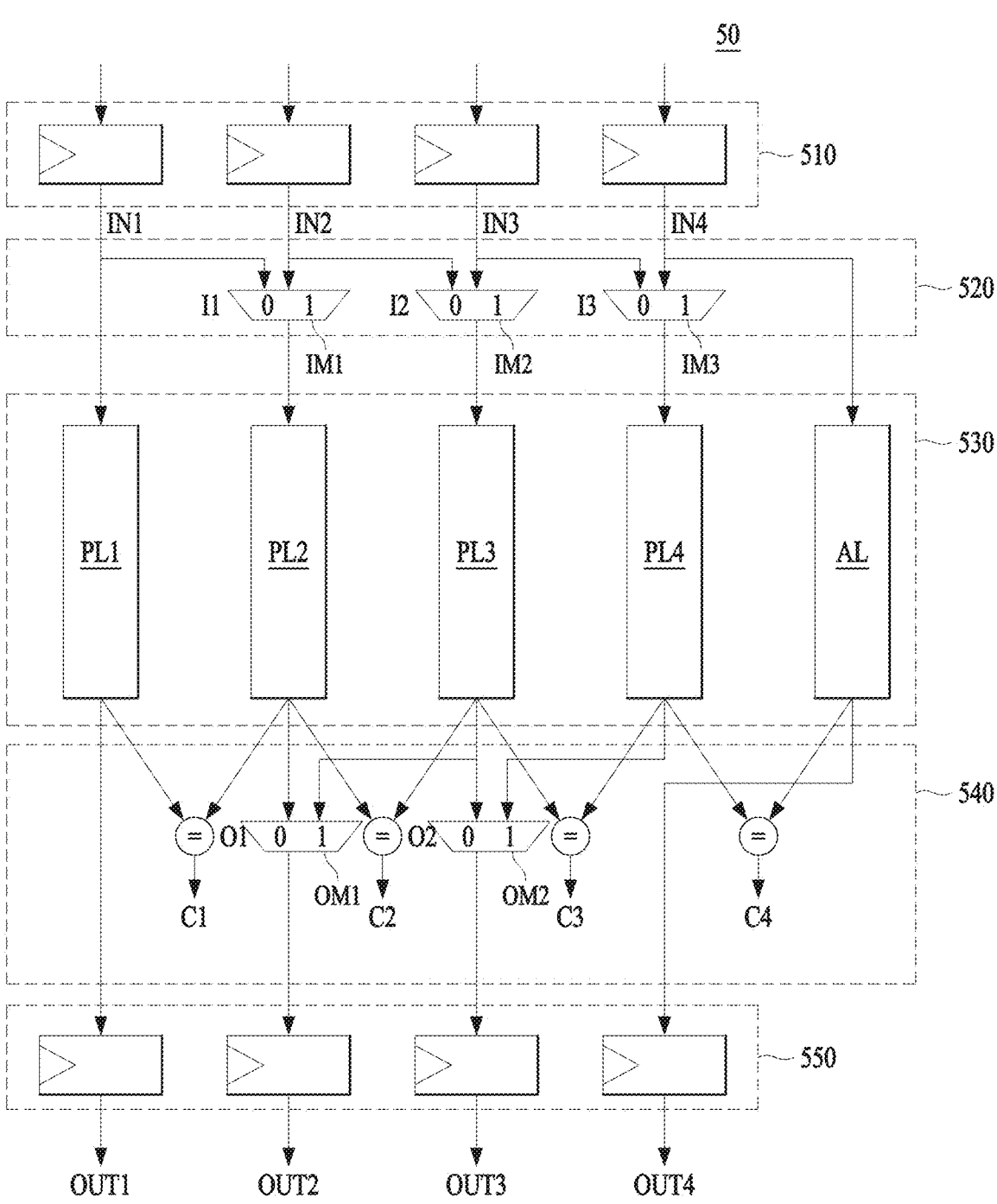
FIG. 5 is a diagram illustrating a structure of an electronic device for performing defect detection according to an example embodiment of the present disclosure.

FIG. 5 is a diagram illustrating a structure of an electronic device 50 performing a defect detection according to an example embodiment of the present disclosure. Referring to FIG. 5, according to an example embodiment of the present disclosure, an operand input part 510 including a plurality of flip-flops, an input selection circuit 520 that selects input data for a plurality of lanes PL1, PL2, PL3, PL4, and AL, a data processing part 530 that processes the input data through the plurality of lanes PL1, PL2, PL3, PL4, and AL, an output selection circuit 540 that compares processing result data derived from the plurality of lanes PL1, PL2, PL3, PL4, and AL to derive comparison result data and selects processing result data derived from each of the plurality of lanes PL1, PL2, PL3, PL4, and AL, and a data output part 550 including a plurality of flip-flops may be included. In FIG. 5, to describe an operation of the electronic device 50 with increased ease, each lane group identified by the electronic device 50 may be set to include two lanes.

In the example embodiment of FIG. 5, the electronic device 50 may identify a first lane group including first and second processing lanes PL1 and PL2, a second lane group including second and third processing lanes PL2 and PL3, a third lane group including third and fourth processing lanes PL3 and PL4, and a fourth lane group including the fourth processing lane PL4 and an additional processing lane AL. In the example embodiment of FIG. 5, since each lane group identified by the electronic device 50 includes two lanes, the input selection circuit 520 may include three 2-to-1 multiplexers IM1, IM2, and IM3, and the output selection circuit 540 may include two 2-to-1 multiplexers OM1 and OM2 as illustrated. However, this is merely an example according to the present disclosure, and structures of the input selection circuit 520 and the output selection circuit 540 are not limited by the example. In another example embodiment, when each lane group identified by the electronic device 50 includes N lanes, each of the input selection circuit 520 and the output selection circuit 540 may include a plurality of N-to-1 multiplexers.

According to the example embodiment of FIG. 5, when a test operation is performed for the first to fourth lane groups, the controller 130 (refer to FIG. 1) may provide control signals for controlling the input selection circuit 520 and the output selection circuit 540 to the plurality of multiplexers IM1, IM2, IM3, OM1, and OM2 included in the input selection circuit 520 and the output selection circuit 540 as shown in Table 1 below.

TABLE 1

| Step | I1 | I2 | I3 | O1 | O2 | C | Lane in which error occurs |
|------|-----|-----|-----|------|------|------|----------------------------|
| 1 | 0 | 0 | 0 | 1 | 1 | C1 | PL1, PL2 |
| 2 | 1 | 0 | 0 | Any | 1 | C2 | PL2, PL3 |
| 3 | 1 | 1 | 0 | 0 | Any | C3 | PL3, PL4 |
| 4 | 1 | 1 | 1 | 0 | 0 | C4 | PL4, AL |

In Step 1, the electronic device 50 may perform an operation corresponding to a first command and determine whether an error occurs for the first lane group. The operand input part 510 may transmit first to fourth input data IN1, IN2, IN3, and IN4 to the input selection circuit 520, the first and second input data IN1 and IN2 may be input to the first multiplexer IM1 included in the input selection circuit 520, the second and third input data IN2 and IN3 may be input to the second multiplexer IM2 included in the input selection circuit 520, and the third and fourth input data IN3 and IN4 may be input to the third multiplexer IM3 included in the input selection circuit 520.

To input identical input data to the first and second processing lanes PL1 and PL2, the controller 130 may provide a first input control signal I1 to the first multiplexer IM1 to output the first input data IN1 among the first and second input data IN1 and IN2, and the first input data IN1 may be input to the second processing lane PL2 according to the first input control signal I1. In addition, the controller 130 may provide a second input control signal 12 to the second multiplexer IM2 to output the second input data IN2 among the second and third input data IN2 and IN3, and may provide a third input control signal I3 to the third multiplexer IM3 to output the third input data IN3 among the third and fourth input data IN3 and IN4. According to the second and third input control signals 12 and 13, the second input data IN2 may be input to the third processing lane PL3, the third input data IN3 may be input to the fourth processing lane PL4, and the fourth input data IN4 may be input to the additional processing lane AL.

Each of the plurality of lanes PL1, PL2, PL3, PL4, and AL may perform data processing corresponding to a command to correspond to input data and derive the processing result data. To determine whether an error occurs for the first lane group, the electronic device 50 may derive first comparison result data C1 with respect to first processing result data derived from the first processing lane PL1 to correspond to the first input data IN1 and second processing result data derived from the second processing lane PL2 to correspond to the first input data IN1 through a comparator included in the output selection circuit 540. When the first and second processing result data match, the first comparison result data C1 may have a first value. When the first and second processing result data do not match, the first comparison result data C1 may have a second value. When the first comparison result data C1 has the second value, the electronic device 50 may identify that an error occurs for the first lane group.

Meanwhile, to derive first to fourth output data OUT1, OUT2, OUT3, and OUT4 corresponding to the first to fourth input data IN1, IN2, IN3, and IN4, the controller 130 may provide first and second output control signals O1 and O2 for controlling the first and second multiplexers OM1 and OM2 included in the output selection circuit 540 for the first and second multiplexers OM1 and OM2, respectively. The first processing result data derived from the first processing lane PL1 to correspond to the first input data IN1 may be output to the first output data OUT1.

In the example embodiment, in order for third processing result data derived through the third processing lane PL3 to correspond to the second input data to be output as the second output data OUT2, the controller 130 may provide the first output control signal O1 to the first multiplexer OM1 so that the third processing result data among the second and third processing result data is output as the second output data OUT2. In addition, the controller 130 may provide the second output control signal O2 to the second multiplexer OM2 to output fourth processing result data among the third processing result data and the fourth processing result data derived through the fourth processing lane PL4 to correspond to the third input data as the third output data OUT3. Fifth processing result data derived from the additional processing lane AL to correspond to the fourth input data IN4 may be output as the fourth output data OUT4.

In Step 2, the electronic device 50 may perform an operation corresponding to a second command and determine whether an error occurs for the second lane group including the second and third processing lanes PL2 and PL3. In Step 2, the first input data IN1 may be input for the first processing lane PL1, and the fourth input data IN4 may be input for the additional processing lane AL. Meanwhile, the controller 130 may provide the first input control signal I1 to the first multiplexer IM1 to output the second input data IN2 among the first and second input data IN1 and IN2, and provide the second input control signal 12 to the second multiplexer IM2 to output the second input data IN2 among the second and third input data IN2 and IN3 in order to input identical input data to the second and third processing lanes PL2 and PL3. The controller 130 may provide the third input control signal I3 to the third multiplexer IM3 to output the third input data IN3 among the third and fourth input data IN3 and IN4.

Whether an error occurs determined for the second lane group in Step 2 may be determined based on second comparison result data C2 derived by comparing the second processing result data derived from the second processing lane PL2 to correspond to the second input data IN2 and the third processing result data derived from the third processing lane PL3 to correspond to the second input data IN2.

In the example embodiment of FIG. 5, the first processing result data derived from the first processing lane PL1 to correspond to the first input data IN1 may be output as the first output data OUT1. Meanwhile, in Step 2, since the test operation for the second lane group is performed, the first output control signal O1 provided for the first multiplexer OM1 included in the output selection circuit 540 may be allowed to have any value to select one of the second processing result data derived through the second processing lane PL2 to correspond to the second input data IN2 and the third processing result data derived through the third processing lane PL3 to correspond to the second input data IN2.

Meanwhile, in order for the fourth processing result data derived through the fourth processing lane PL4 to correspond to the third input data to output as the third output data OUT3, the controller 130 may provide the second output control signal O2 to the second multiplexer OM2 included in the output selection circuit 540 so that the fourth processing result data among the third and fourth processing result data is output as the third output data OUT3. The fifth processing result data derived from the additional processing lane AL to correspond to the fourth input data IN4 may be output as the fourth output data OUT4.

Like Step 1 and Step 2 described above, the electronic device 50 may perform a test operation for the third lane group including the third and fourth processing lanes PL3 and PL4 in Step 3 and may perform a test operation for the fourth lane group including the fourth processing lane PL4 and the additional processing lane AL in Step 4.

Figure 6:
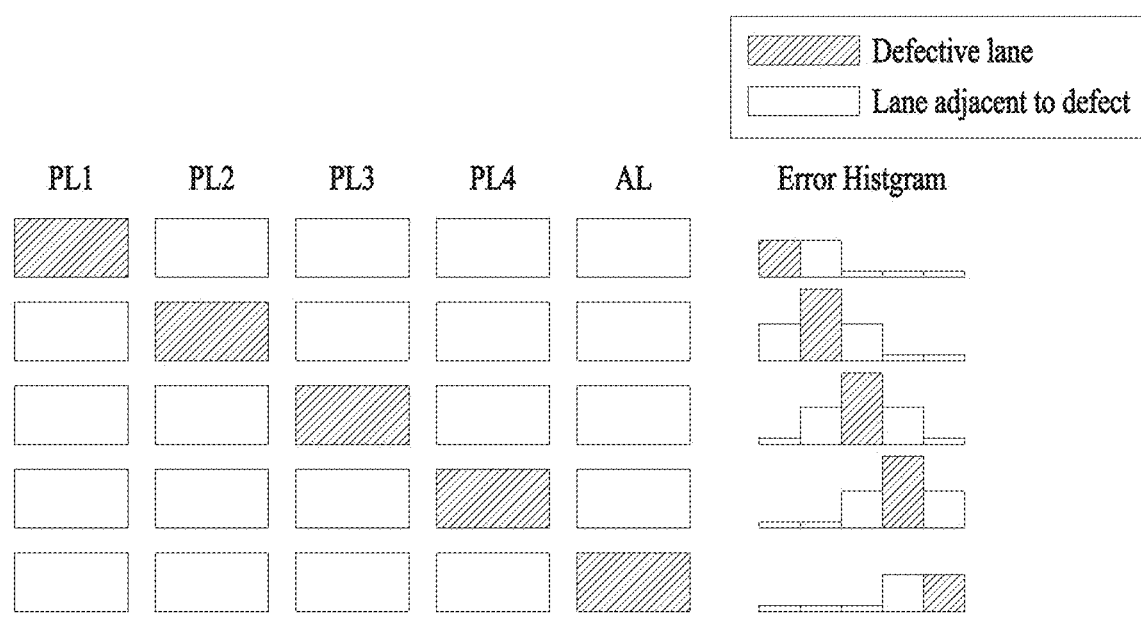
FIG. 6 is a diagram illustrating a method of detecting a lane in which a defect occurs in the electronic device of FIG. 5.

FIG. 6 is a diagram illustrating a method of detecting a lane having a defect by the electronic device 50 (refer to FIG. 5) illustrated in FIG. 5. FIG. 6 illustrates a result corresponding to the example embodiment of FIG. 5.

In the example embodiment, when a defect occurs in the first processing lane PL1 only, whether an error occurs may be determined based on the test operation (Step 1 of Table 1) for the first lane group including the first and second processing lanes PL1 and PL2. When a defect occurs in the first processing lane PL1, the first comparison result data C1 (refer to FIG. 5) derived in Step 1 may have a second value, and the electronic device 50 according to an example embodiment of the present disclosure may increase a counter value of a counter corresponding to each of the first and second processing lanes PL1 and PL2. In an example of FIG. 6, the counter value may increase by one when an error occurs.

In the example embodiment, when a defect occurs in the second processing lane PL2 only, whether an error occurs may be determined based on the test operation (Step 1 of Table 1) for the first lane group including the first and second processing lanes PL1 and PL2, and whether an error occurs may be determined based on the test operation (Step 2 of Table 1) for the second lane group including the second and third processing lanes PL2 and PL3. When a defect occurs in the second processing lane PL2, the counter value of the counter corresponding to each of the first and second processing lanes PL1 and PL2 may increase by one based on the first comparison result data C1 derived in Step 1, and the counter value of the counter corresponding to each of the second and third processing lanes PL2 and PL3 may increase by one based on the second comparison result data C2 derived in Step 2. Through processes of Step 1 and Step 2, the electronic device 50 may detect a defect occurrence for the second processing lane PL2 for which the counter value is calculated as two.

Meanwhile, In the example embodiment, when a defect occurs in the third processing lane PL3 only, whether an error occurs may be determined based on the test operation (Step 2 of Table 1) for the second lane group and the test operation (Step 3 of Table 1) for the third lane group, and through processes of Step 2 and Step 3, the electronic device 50 may detect a defect occurrence for the third processing lane PL3 for which the counter value is calculated as two. In addition, when a defect occurs in the fourth processing lane PL4 only, whether an error occurs may be determined based on the test operation (Step 3 of Table 1) for the third lane group and the test operation (Step 4 of Table 1) for the fourth lane group, and through processes of Step 3 and Step 4, the electronic device 50 may detect a defect occurrence for the fourth processing lane PL4 for which the counter value is calculated as two.

Meanwhile, when a defect occurs in the additional processing lane AL only, whether an error occurs may be determined based on the test operation (Step 4 of Table 1) for the fourth lane group including the fourth processing lane PL4 and the additional processing lane AL, and the electronic device 50 may increase the counter value of the counter corresponding to each of the fourth processing lane PL4 and the additional processing lane AL by one.

In some example embodiments of the present disclosure, the electronic device 50 may accumulate the counter value corresponding to each of the plurality of lanes PL1, PL2, PL3, PL4, and AL for a set period of time and identify a defect occurring lane based on a cumulative counter value. Specifically, when a cycle for performing the processes of Step 1 through Step 4 shown in Table 1 is T, the electronic device 50 may accumulate the counter value corresponding to each of the plurality of lanes PL1, PL2, PL3, PL4, and AL for a period nT, n being a natural number, and identify a defect occurring lane based on whether the cumulative counter value exceeds a threshold value.

Figure 7:
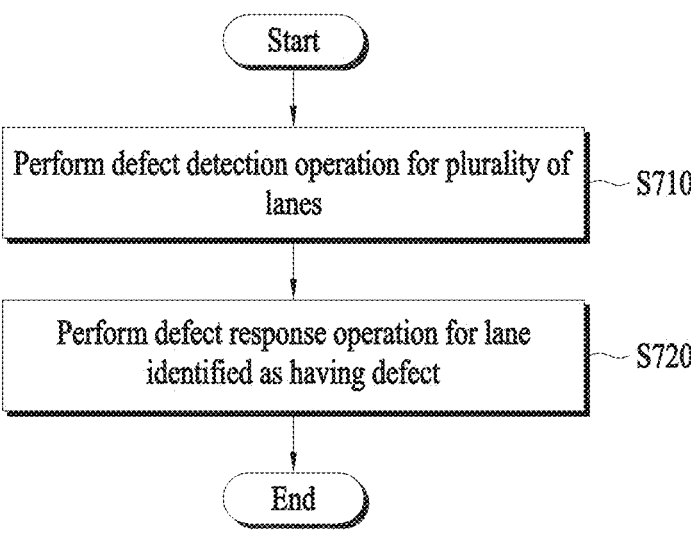
FIG. 7 is a flowchart illustrating an operation method of an electronic device according to another example embodiment of the present disclosure.

FIG. 7 is a flowchart illustrating an operation method of the electronic device 10 (refer to FIG. 1) according to another example embodiment of the present disclosure. Specifically, FIG. 7 is a flowchart for describing an operation method of the electronic device 10 performing a defect detection and a defect response according to an example embodiment of the present disclosure.

In operation S710, the electronic device 10 may detect whether a defect occurs for at least one of the plurality of lanes 110_1, 110_2, . . . , 110_N, and 120 included in the electronic device 10 through operation S310 through operation S330 of FIG. 3 as described above.

In operation S720, the electronic device 10 may perform a defect response operation for a lane identified as having a defect. Specifically, the electronic device 10 may use the controller 130 (refer to FIG. 1) to control to deactivate the lane having the defect and control lanes other than the lane having the defect among the plurality of lanes to process the input data. The defect response operation according to an example embodiment of the present disclosure will be described in detail through FIG. 8 through FIG. 10 described below. Meanwhile, in some example embodiments, when the lane in which the defect occurs is identified, the electronic device 10 may output a signal indicating that the defect occurs through an output part.

Figure 8:
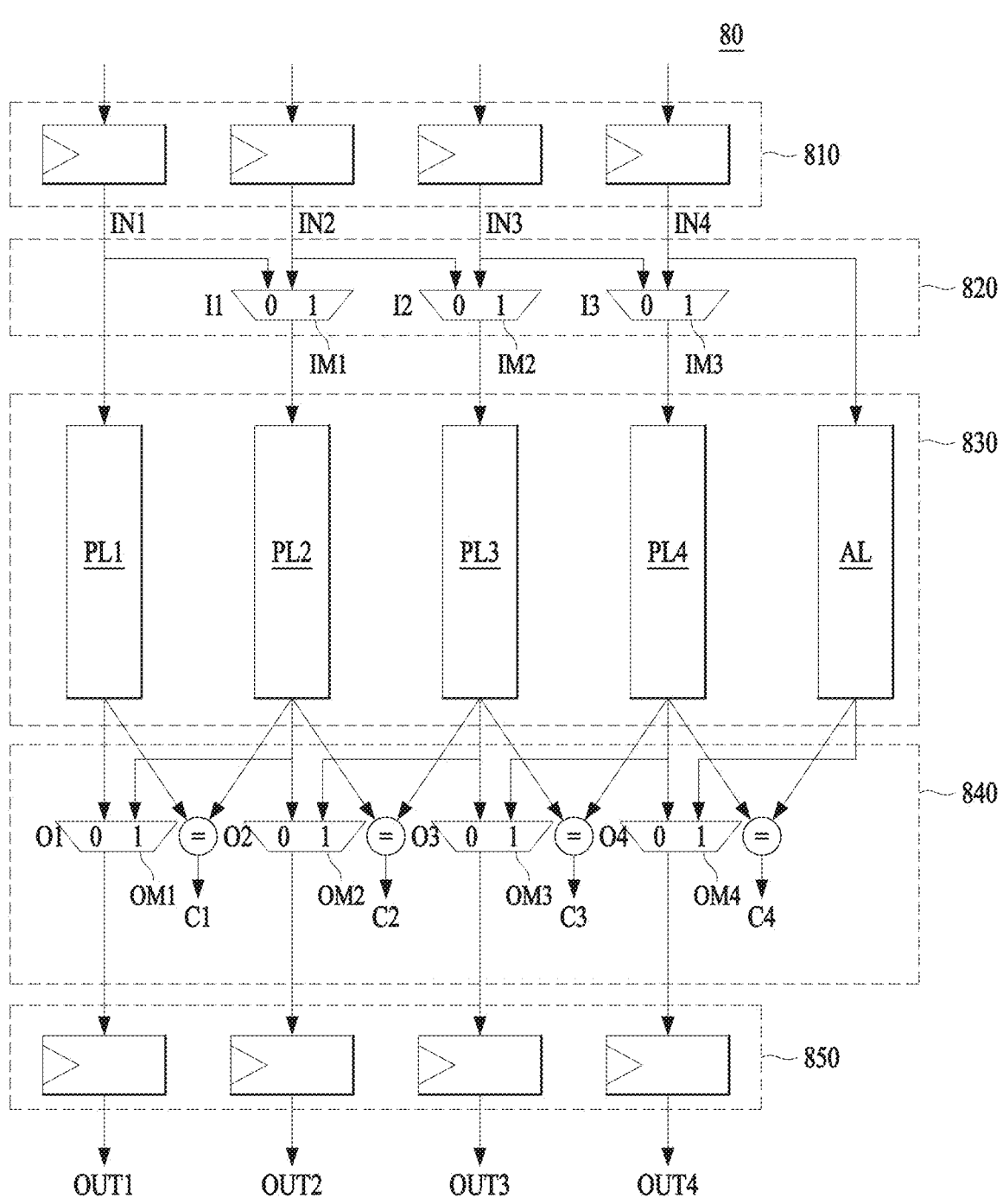
FIG. 8 is a diagram illustrating a structure of an electronic device for performing defect detection and defect response according to an example embodiment of the present disclosure.

FIG. 8 is a diagram illustrating a structure of an electronic device 80 performing a defect detection and a defect response according to an example embodiment of the present disclosure. Referring to FIG. 8, the electronic device 80 according to an example embodiment may include an operand input part 810, an input selection circuit 820, a data processing part 830, an output selection circuit 840, and a data output part 850, and the aforementioned elements may correspond to the elements of the electronic device 50 (refer to FIG. 5) illustrated in FIG. 5. In FIG. 8, to describe an operation of the electronic device 80 with increased ease, each lane group identified by the electronic device 80 may be set to include two lanes. In the example embodiment of FIG. 8, the electronic device 80 may identify a first lane group including the first and second processing lanes PL1 and PL2, a second lane group including the second and third processing lanes PL2 and PL3, a third lane group including the third and fourth processing lanes PL3 and PL4, and a fourth lane group including the fourth processing lane PL4 and the additional processing lane AL. In the example embodiment of FIG. 8, since each lane group identified by the electronic device 80 includes two lanes, the input selection circuit 820 may include three 2-to-1 multiplexers IM1, IM2, and IM3, and the output selection circuit 840 may include four 2-to-1 multiplexers OM1, OM2, OM3, and OM4 as illustrated. However, this is merely an example according to the present disclosure, and structures of the input selection circuit 820 and the output selection circuit 840 are not limited by the example. According to the example embodiment of FIG. 8, when a test operation is performed for the first to fourth lane groups, the controller 130 (refer to FIG. 1) may provide control signals for controlling the input selection circuit 820 and the output selection circuit 840 to the plurality of multiplexers IM1, IM2, IM3, OM1, OM2, OM3, and OM4 included in the input selection circuit 820 and the output selection circuit 840 as shown in Table 2 below.

TABLE 2

| Step | I1 | I2 | I3 | O1 | O2 | O3 | O4 | C | Lane in which error occurs |
|---|---|---|---|---|---|---|---|---|---|
| 1 | 0 | 0 | 0 | Any | 1 | 1 | 1 | C1 | PL1, PL2 |
| 2 | 1 | 0 | 0 | 0 | Any | 1 | 1 | C2 | PL2, PL3 |
| 3 | 1 | 1 | 0 | 0 | 0 | Any | 1 | C3 | PL3, PL4 |
| 4 | 1 | 1 | 1 | 0 | 0 | 0 | Any | C4 | PL4, AL |

In Step 1, the electronic device 80 may perform an operation corresponding to a first command and determine whether an error occurs for the first lane group. The operand input part 810 may transmit first to fourth input data IN1, IN2, IN3, and IN4 to the input selection circuit 820, the first and second input data IN1 and IN2 may be input to the first multiplexer IM1 included in the input selection circuit 820, the second and third input data IN2 and IN3 may be input to the second multiplexer IM2 included in the input selection circuit 820, and the third and fourth input data IN3 and IN4 may be input to the third multiplexer IM3 included in the input selection circuit 820.

To input identical input data to the first and second processing lanes PL1 and PL2, the controller 130 may provide a first input control signal I1 to the first multiplexer IM1 to output the first input data IN1 among the first and second input data IN1 and IN2, and the first input data IN1 may be input to the second processing lane PL2 according to the first input control signal I1. In addition, the controller 130 may provide a second input control signal 12 to the second multiplexer IM2 to output the second input data IN2 among the second and third input data IN2 and IN3, and may provide a third input control signal 13 to the third multiplexer IM3 to output the third input data IN3 among the third and fourth input data IN3 and IN4. According to the second and third input control signals 12 and 13, the second input data IN2 may be input to the third processing lane PL3, the third input data IN3 may be input to the fourth processing lane PL4, and the fourth input data IN4 may be input to the additional processing lane AL.

Each of the plurality of lanes PL1, PL2, PL3, PL4, and AL may perform data processing corresponding to a command to correspond to input data and derive the processing result data. To determine whether an error occurs for the first lane group, the electronic device 80 may derive first comparison result data C1 with respect to the first processing result data derived from the first processing lane PL1 to correspond to the first input data IN1 and the second processing result data derived from the second processing lane PL2 to correspond to the first input data IN1 through a comparator included in the output selection circuit 840. When the first and second processing result data match, the first comparison result data C1 may have a first value. When the first and second processing result data do not match, the first comparison result data C1 may have a second value. When the first comparison result data C1 has the second value, the electronic device 80 may identify that an error occurs for the first lane group.

Meanwhile, to derive first to fourth output data OUT1, OUT2, OUT3, and OUT4 corresponding to the first to fourth input data IN1, IN2, IN3, and IN4, the controller 130 may provide first to fourth output control signals O1, O2, O3, and O4 for controlling the first to fourth multiplexers OM1, OM2, OM3, and OM4 included in the output selection circuit 840 to the first to fourth multiplexers OM1, OM2, OM3, and OM4, respectively. Since the test operation for the first lane group is performed, one of the first processing result data derived from the first processing lane PL1 and the second processing result data derived from the second processing lane PL2 may be output as the first output data OUT1, and the first output control signal O1 for the first multiplexer OM1 included in the output selection circuit 840 may be allowed to have any value.

Meanwhile, in order for the third processing result data derived through the third processing lane PL3 to correspond to the second input data to output as the second output data OUT2, the controller 130 may provide the second output control signal O2 to the second multiplexer OM2 so that the third processing result data among the second and third processing result data is output as the second output data OUT2. In addition, the controller 130 may provide the third output control signal O3 to the third multiplexer OM3 in order for the fourth processing result data among the third processing result data and the fourth processing result data derived through the fourth processing lane PL4 to correspond to the third input data to output as the third output data OUT3, and may provide the fourth output control signal O4 to the fourth multiplexer OM4 in order for the fifth processing result data among the fourth processing result data and the fifth processing result data derived through the additional processing lane AL to correspond to the fourth input data to output as the fourth output data OUT4.

In Step 2, the electronic device 80 may perform an operation corresponding to a second command and determine whether an error occurs for the second lane group including the second and third processing lanes PL2 and PL3. In Step 2, the first input data IN1 may be input for the first processing lane PL1, and the fourth input data IN4 may be input for the additional processing lane AL. Meanwhile, the controller 130 may provide the first input control signal I1 to the first multiplexer IM1 so that the second input data IN2 is output among the first and second input data IN1 and IN2, and to input identical input data to the second and third processing lanes PL2 and PL3, may provide the second input control signal 12 to the second multiplexer IM2 so that the second input data IN2 is output among the second and third input data IN2 and IN3. The controller 130 may provide the third input control signal 13 to the third multiplexer IM3 so that the third input data IN3 is output among the third and fourth input data IN3 and IN4.

Meanwhile, in Step 2, in order for the first processing result data derived through the first processing lane PL1 to correspond to the first input data to output as the first output data OUT1, the controller 130 may provide the first output control signal O1 to the first multiplexer OM1 included in the output selection circuit 840 so that the first processing result data among the first and second processing result data is output as the first output data OUT1. In order for the fourth processing result data derived through the fourth processing lane PL4 to correspond to the third input data to output as the third output data OUT3, the controller 130 may provide the third output control signal O3 to the third multiplexer OM3 included in the output selection circuit 840 so that the fourth processing result data among the third and fourth processing result data is output as the third output data OUT3, and in order for the fifth processing result data derived through the additional processing lane AL to correspond to the fourth input data to output as the fourth output data OUT4, the controller 130 may provide the fourth output control signal O4 to the fourth multiplexer OM4 included in the output selection circuit 840 so that the fifth processing result data among the fourth and fifth processing result data is output as the fourth output data OUT4. In Step 2, since the test operation for the second lane group is performed, the second output control signal O2 provided to the second multiplexer OM2 included in the output selection circuit 840 may be allowed to have any value to select one of the second processing result data derived through the second processing lane PL2 to correspond to the second input data IN2 and the third processing result data derived through the third processing lane PL3 to correspond to the second input data IN2. In addition, the electronic device 80 may derive second comparison result data with respect to the second processing result data and the third processing result data through the comparator included in the output selection circuit 840.

Like Step 1 and Step 2 described above, the electronic device 80 may perform a test operation for the third lane group including the third and fourth processing lanes PL3 and PL4 in Step 3, and may perform a test operation for the fourth lane group including the fourth processing lane PL4 and the additional processing lane AL in Step 4. As described with reference to FIG. 6, the electronic device 80 of FIG. 8 may detect a defect for at least one of the plurality of lanes PL1, PL2, PL3, PL4, and AL based on a counter value corresponding to each of the plurality of lanes PL1, PL2, PL3, PL4, and AL.

Meanwhile, the electronic device 80 according to an example embodiment of the present disclosure may perform a defect response operation on a lane having the defect detected through the aforementioned process. In the example embodiment, the defect response operation may be performed based on a control signal as shown in Table 3 below.

TABLE 3

| Lane in which defect occurs | I1 | I2 | I3 | O1 | O2 | O3 | O4 |
|---|---|---|---|---|---|---|---|
| PL1 | 0 | 0 | 0 | 1 | 1 | 1 | 1 |
| PL2 | Any | 0 | 0 | 0 | 1 | 1 | 1 |
| PL3 | 1 | Any | 0 | 0 | 0 | 1 | 1 |
| PL4 | 1 | 1 | Any | 0 | 0 | 0 | 1 |
| AL | 1 | 1 | 1 | 0 | 0 | 0 | 0 |

When it is detected through a defect detection operation of the electronic device 80 that a defect occurs in the first processing lane PL1, the electronic device 80 may deactivate the first processing lane PL1 and process data through the second to fourth processing lanes PL2, PL3, PL4 and the additional processing lane AL. Specifically, the electronic device 80 may use the controller 130 to provide the first input control signal I1 to the first multiplexer IM1 included in the input selection circuit 820 so that the first input data IN1 is input to the second processing lane PL2. In addition, the electronic device 80 may use the controller 130 to provide the first output control signal O1 to the first multiplexer OM1 included in the output selection circuit 840 so that the second processing result data derived from the second processing lane PL2 to correspond to the first input data IN1 is output as the first output data OUT1.

Also, using the controller 130, the electronic device 80 may provide the second input control signal I2 to the second multiplexer IM2 included in the input selection circuit 820 so that the second input data IN2 is input to the third processing lane PL3, and provide the second output control signal O2 to the second multiplexer OM2 included in the output selection circuit 840 so that the third processing result data derived from the third processing lane PL3 is output as the second output data OUT2. Also, using the controller 130, the electronic device 80 may provide the third input control signal I3 to the third multiplexer IM3 included in the input selection circuit 820 so that the third input data IN3 is input to the fourth processing lane PL4, and provide the third output control signal O3 to the third multiplexer OM3 included in the output selection circuit 840 so that the fourth processing result data derived from the fourth processing lane PL4 is output as the third output data OUT3.

Meanwhile, the electronic device 80 may use the controller 130 to provide the fourth output control signal O4 to the fourth multiplexer OM4 included in the output selection circuit 840 so that the fifth processing result data derived from the additional processing lane AL to correspond to the fourth input data IN4 is output as the fourth output data OUT4.

When it is detected through the defect detection operation of the electronic device 80 that a defect occurs in the second processing lane PL2, the control signals may be provided to input the first input data IN1 to the first processing lane PL1, output the first processing result data derived from the first processing lane PL1 as the first output data OUT1, input the second input data IN2 to the third processing lane PL3, output the third processing result data derived from the third processing lane PL3 as the second output data OUT2, input the third input data IN3 to the fourth processing lane PL4, output the fourth processing result data derived from the fourth processing lane PL4 as the third output data OUT3, input the fourth input data IN4 to the additional processing lane AL, and output the fifth processing result data derived from the additional processing lane AL as the fourth output data OUT4.

In this case, the electronic device 80 may deactivate the second processing lane PL2, and in response to the second processing lane PL2 being deactivated, the control signal for the first multiplexer IM1 included in the input selection circuit selecting the input data for the second processing lane PL2 may be allowed to have any value. Meanwhile, according to the aforementioned principle, when it is detected that a defect occurs in each of the third processing lane PL3, the fourth processing lane PL4, and the additional processing lane AL, the electronic device 80 may provide a control signal for a target element to select input data and output data.

Figure 9:
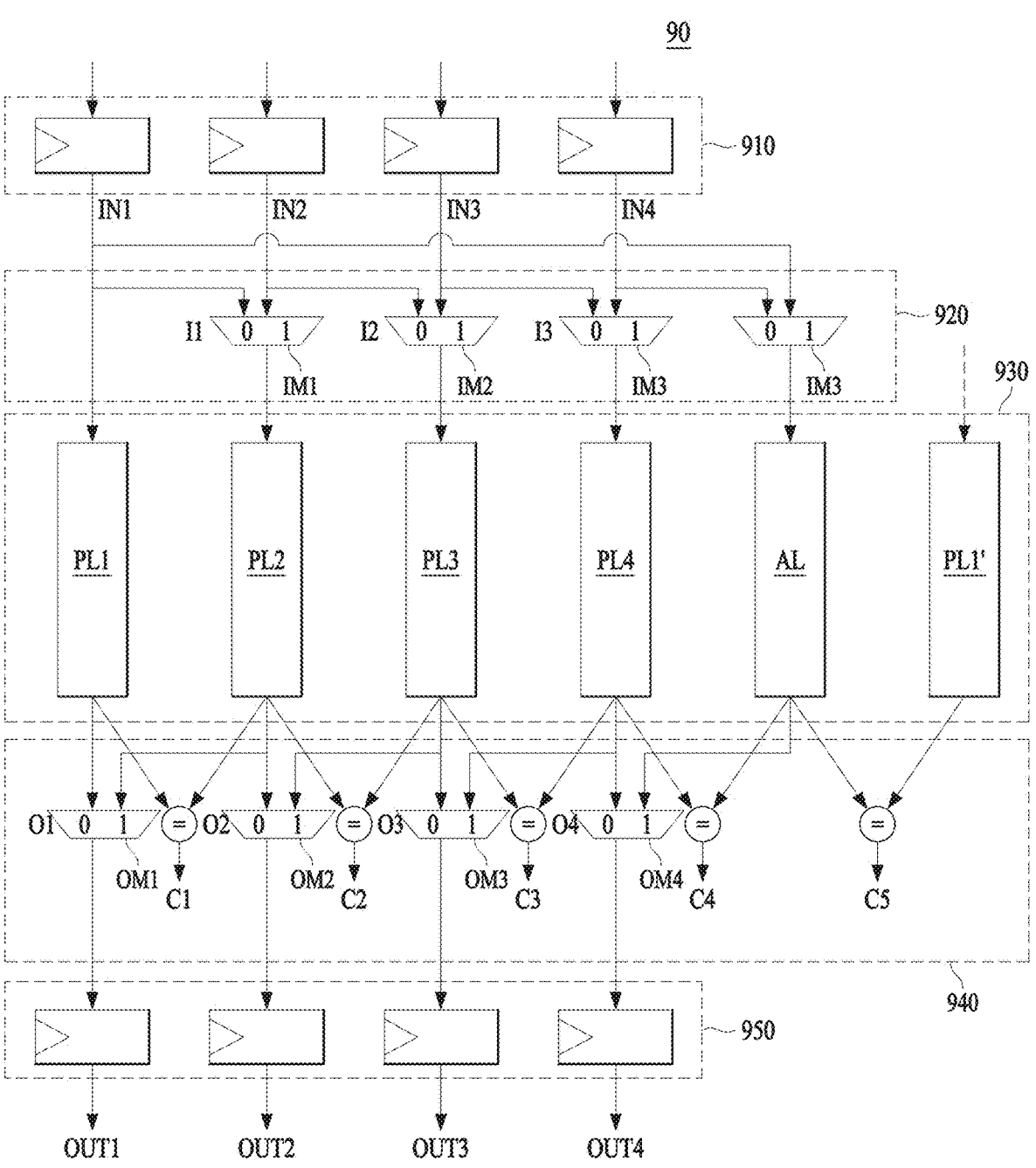
FIG. 9 is a diagram illustrating a structure of an electronic device for performing defect detection and defect response according to another example embodiment of the present disclosure.

FIG. 9 is a diagram illustrating a structure of an electronic device 90 performing a defect detection and a defect response according to another example embodiment of the present disclosure. Unlike the electronic device 80 (refer to FIG. 8) illustrated in FIG. 8, in the electronic device 90 of FIG. 9, identical input data may be input to the first processing lane PL1 and the additional processing lane AL. In FIG. 9, a l'-th processing lane PL' is illustrated only for ease and convenience of description and may not be an actual element. Thus, the l'-th processing lane PL' of FIG. 9 may indicate the first processing lane PL1.

In FIG. 9, to describe an operation of the electronic device 90 with increased ease, each lane group identified by the electronic device 90 may be set to include two lanes. Accordingly, the electronic device 90 may identify a first lane group including the first and second processing lanes PL1 and PL2, a second lane group including the second and third processing lanes PL2 and PL3, a third lane group including the third and fourth processing lanes PL3 and PL4, a fourth lane group including the fourth processing lane PL4 and the additional processing lane AL, and the fifth lane group including the additional processing lane AL and the first processing lane PL1.

As illustrated, in the example embodiment of FIG. 9 since the electronic device 90 determines whether an error occurs for five lane groups, an input selection circuit 920 may include four 2-to-1 multiplexers IM1, IM2, IM3, and IM4 to select input data and an output selection circuit 940 may include four 2-to-1 multiplexers OM1, OM2, OM3, and OM4 to select output data. According to the example embodiment of FIG. 9, when test operations are performed on the first to fifth lane groups, the controller 130 may provide control signals for controlling the first to fourth multiplexers IM1, IM2, IM3, and IM4 included in the input selection circuit 920 and the first to fourth multiplexers OM1, OM2, OM3, and OM4 included in the output selection circuit 940 to corresponding target elements as shown in Table 4 below.

TABLE 4

| Step | I1 | I2 | I3 | I4 | O1 | O2 | O3 | O4 | C | Lane in which error occurs |
|------|----|----|----|----|-----|-----|-----|-----|----|-----|
| 1 | 0 | 0 | 0 | 0 | Any | 1 | 1 | 1 | C1 | PL1, PL2 |
| 2 | 1 | 0 | 0 | 0 | 0 | Any | 1 | 1 | C2 | PL2, PL3 |
| 3 | 1 | 1 | 0 | 0 | 0 | 0 | Any | 1 | C3 | PL3, PL4 |
| 4 | 1 | 1 | 1 | 0 | 0 | 0 | 0 | Any | C4 | PL4, AL |
| 5 | 1 | 1 | 1 | 1 | 0 | 0 | 0 | 0 | C5 | AL, PL1 |

In Step 1 to Step 4 of Table 4, the electronic device 90 may perform a test operation for determining whether an error occurs according to the same principle as described with reference to FIG. 8. In Step 5, the electronic device 90 may additionally perform a test operation on the fifth lane group including the additional processing lane AL and the first processing lane PL1.

Specifically, the electronic device 90 may input the first input data IN1 to the additional processing lane AL and the first processing lane PL1. In this instance, the electronic device 90 may use the controller 130 to provide a fourth input control signal IN4 to the fourth multiplexer IM4 included in the input selection circuit 920 so that the first input data IN1 is selected from the first input data IN1 and the fourth input data IN4 input to the fourth multiplexer IM4. The electronic device 90 may derive fifth comparison result data C5 by comparing first processing result data derived through the first processing lane PL1 to correspond to the first input data IN1 with fifth processing result data derived through the additional processing lane AL to correspond to the first input data IN1. When the first processing result data and the fifth processing result data match, the fifth comparison result data C5 may have a first value. When the first processing result data and the fifth processing result data do not match, the fifth comparison result data C5 may have a second value.

In Step 5, the controller 130 may provide the first output control signal O1 to the first multiplexer OM1 included in the output selection circuit so that the first processing result data derived through the first processing lane PL1 to correspond to the first input data IN1 is output as the first output data OUT1.

Figure 10:
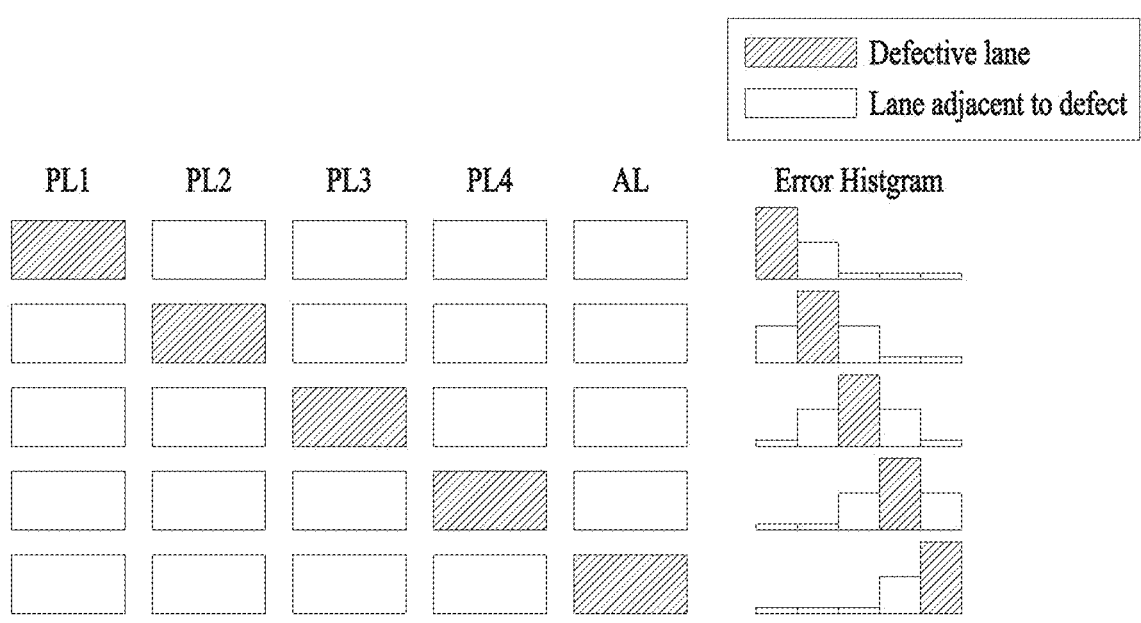
FIG. 10 is a diagram illustrating a method of detecting a lane in which a defect occurs in the electronic device of FIG. 9.

FIG. 10 is a diagram illustrating a method of detecting a lane having a defect in the electronic device 90 (refer to FIG. 9) illustrated in FIG. 9. FIG. 10 illustrates a result corresponding to the example embodiment of FIG. 9. In an example of FIG. 10, a counter value corresponding to each lane included in a lane group identified as having an error may increase by one.

In the example embodiment, when a defect occurs in the first processing lane PL1 only, whether an error occurs may be determined through the test operation for the first lane group (Step 1 of Table 4) and the test operation for the fifth lane group (Step 5 of Table 4), and through the process of Step 1 and Step 5, the electronic device 90 may detect a defect occurrence for the first processing lane PL1 for which a counter value is calculated as "2." When a defect occurs in the second processing lane PL2 only, whether an error occurs may be determined through the test operation for the first lane group (Step 1 of Table 4) and the test operation for the second lane group (Step 2 of Table 4), and through the process of Step 1 and Step 2, the electronic device 90 may detect a defect occurrence for the second processing lane PL2 for which a counter value is calculated as "2." When a defect occurs in the third processing lane PL3 only, whether an error occurs may be determined through the test operation for the second lane group (Step 2 of Table 4) and the test operation for the third lane group (Step 3 of Table 4), and through the process of Step 2 and Step 3, the electronic device 90 may detect a defect occurrence for the third processing lane PL3 for which a counter value is calculated as "2." When a defect occurs in the fourth processing lane PL4 only, whether an error occurs may be determined through the test operation for the third lane group (Step 3 of Table 4) and the test operation for the fourth lane group (Step 4 of Table 4), and through the process of Step 3 and Step 4, the electronic device 90 may detect a defect occurrence for the fourth processing lane PL4 for which a counter value is calculated as "2." Meanwhile, when a defect occurs in the additional processing lane AL only, whether an error occurs may be determined through the test operation for the fourth lane group (Step 4 of Table 4) and the test operation for the fifth lane group (Step 5 of Table 4), and through the process of Step 4 and Step 5, the electronic device 90 may detect a defect occurrence for the additional processing lane AL for which a counter value is calculated as "2."

The electronic device 90 according to an example embodiment of the present disclosure may detect a lane having a defect through the aforementioned processes and perform a defect response operation for the lane having a defect. In the example embodiment, the defect response operation may be performed based on a control signal as shown in Table 5 below.

TABLE 5

| Lane in which defect occurs | I1 | I2 | I3 | I4 | O1 | O2 | O3 | O4 |
|------|----|----|----|----|-----|-----|-----|-----|
| PL1 | | 0 | 0 | 0 | 0 | 1 | 1 | 1 | 1 |
| PL2 | | Any | 0 | 0 | 0 | 0 | 1 | 1 | 1 |

TABLE 5-continued

| Lane in which defect occurs | I1 | I2 | I3 | I4 | O1 | O2 | O3 | O4 |
|---|---|---|---|---|---|---|---|---|
| PL3 | 1 | Any | 0 | 0 | 0 | 0 | 1 | 1 |
| PL4 | 1 | 1 | Any | 0 | 0 | 0 | 0 | 1 |
| AL | 1 | 1 | 1 | Any | 0 | 0 | 0 | 0 |

When it is detected through the defect detection operation of the electronic device 90 that a defect occurs in the first processing lane PL1, the control signal may be provided to input the first input data IN1 to the second processing lane PL2, output the second processing result data derived from the second processing lane PL2 as the first output data OUT1, input the second input data IN2 to the third processing lane PL3, output the third processing result data derived from the third processing lane PL3 as the second output data OUT2, input the third input data IN3 to the fourth processing lane PL4, output the fourth processing result data derived from the fourth processing lane PL4 as the third output data OUT3, input the fourth input data IN4 to the additional processing lane AL, and output the fifth processing result data derived from the additional processing lane AL as the fourth output data OUT4. In this case, the electronic device 90 may deactivate the first processing lane PL1.

When it is detected through the defect detection operation of the electronic device 90 that a defect occurs in the second processing lane PL2, the control signal may be provided to input the first input data IN1 to the first processing lane PL1, output the first processing result data derived from the first processing lane PL1 as the first output data OUT1, input the second input data IN2 to the third processing lane PL3, output the third processing result data derived from the third processing lane PL3 as the second output data OUT2, input the third input data IN3 to the fourth processing lane PL4, output the fourth processing result data derived from the fourth processing lane PL4 as the third output data OUT3, input the fourth input data IN4 to the additional processing lane AL, and output the fifth processing result data derived from the additional processing lane AL as the fourth output data OUT4. In this case, the electronic device 90 may deactivate the second processing lane PL2. In response to the second processing lane PL2 being deactivated, the control signal for the first multiplexer IM1 included in the input selection circuit 920 to select input data for the second processing lane PL2 may be allowed to have any value. Meanwhile, according to the aforementioned principle, when it is detected that a defect occurs in each of the third processing lane PL3, the fourth processing lane PL4, and the additional processing lane AL, the electronic device 90 may provide a control signal for a target element to select input data and output data.

The device in accordance with the above-described example embodiments may include a processor, a memory which stores and executes program data, a permanent storage such as a disk drive, a communication port for communication with an external device, and a user interface device such as a touch panel, a key, and a button. Methods realized by software modules or algorithms may be stored in a computer-readable recording medium as computer-readable codes or program commands which may be executed by the processor. Here, the computer-readable recording medium may be a magnetic storage medium (for example, a read-only memory (ROM), a random-access memory (RAM), a floppy disk, or a hard disk) or an optical reading medium (for example, a CD-ROM or a digital versatile disc (DVD)). The computer-readable recording medium may be dispersed to computer systems connected by a network so that computer-readable codes may be stored and executed in a dispersion manner. The medium may be read by a computer, may be stored in a memory, and may be executed by the processor.

The present example embodiments may be represented by functional blocks and various processing steps. These functional blocks may be implemented by various numbers of hardware and/or software configurations that execute specific functions. For example, the present example embodiments may adopt direct circuit configurations such as a memory, a processor, a logic circuit, and a look-up table that may execute various functions by control of one or more microprocessors or other control devices. Similarly to that elements may be executed by software programming or software elements, the present example embodiments may be implemented by programming or scripting languages such as C, C++, Java, assembler, and Python including various algorithms implemented by combinations of data structures, processes, routines, or of other programming configurations. Functional aspects may be implemented by algorithms executed by one or more processors. In addition, the present embodiments may adopt the related art for electronic environment setting, signal processing, and/or data processing, for example. The terms "mechanism", "element", "means", and "configuration" may be widely used and are not limited to mechanical and physical components. These terms may include meaning of a series of routines of software in association with a processor, for example.

The above-described example embodiments are merely examples and other embodiments may be implemented within the scope of the following claims.

[National research and development project supporting this invention]
[Project unique number] 1711152619
[Project number] 2021-0-00310-004
[Ministry Name] Ministry of Science and ICT
[Project management (specialized) institute name] Information and Communication Planning and Evaluation Institute
[Research project name] Next-generation intelligent semiconductor technology development (design)
[Research project name] Development of 2,000 TFLOPS server artificial intelligence deep learning processor and module
[Contribution rate] 1/1
[Name of the entity performing the project] Sapeon Korea Co., Ltd.
[Research Period] 2021.04.01-2024.12.31

The invention claimed is:

1. An operation method of an electronic device comprising a plurality of processing lanes and at least one additional processing lane, wherein the at least one additional processing lane comprises physical or logical circuity having a same structure as that of the plurality of processing lanes, and the operation method comprising:

identifying a lane group including lanes to process identical input data among a plurality of lanes including the plurality of processing lanes and the at least one additional processing lane;

identifying, for each of a plurality of lane groups, comparison result data indicating a result of comparison between processing result data of lanes included in each lane group; and detecting whether a defect occurs for at least one of the plurality of lanes based on the comparison result data of the plurality of lane groups, wherein when a defect occurs for at least one of the plurality of lanes, the method further comprising controlling the at least one of the plurality of lanes in which the defect occurs to be deactivated and controlling input data to be processed by remaining lanes of the plurality of processing lanes or the at least one additional processing lane in which there is a lack of the defect.

2. The operation method of claim 1, wherein the identifying of the lane group comprises identifying a first lane group to process first input data through an N-th lane group to process N-th input data, N being a natural number greater than or equal to "2".

3. The operation method of claim 2, wherein the N is set to correspond to a number of the plurality of processing lanes, and a number of lanes included in each of the plurality of lane groups is set to correspond to a number of the at least one additional processing lane.

4. The operation method of claim 1, wherein the identifying of the comparison result data for each of a plurality of lane groups comprises:

controlling first input data to be input to each of lanes included in a first lane group; and controlling second input data to be input to each of lanes included in a second lane group based on a processing progress status of the lanes included in the first lane group.

5. The operation method of claim 1, wherein the plurality of lane groups includes a first lane group and a second lane group, the first lane group includes a first lane and a second lane, the second lane group includes the second lane and a third lane, and wherein the detecting of whether the defect occurs for the at least one of the plurality of lanes comprises determining whether a defect occurs for at least one of the first lane, the second lane, and the third lane based on first comparison result data on the first lane group and second comparison result data on the second lane group.

6. The operation method of claim 1, wherein the comparison result data has:

a first value when lanes included in the each lane group have identical processing result data; and a second value when the lanes included in the each lane group have different processing result data, and wherein the detecting of whether the defect occurs for at least one of the plurality of lanes comprises:

when comparison result data has the second value, increasing a counter value of each of lanes corresponding to the comparison result data; and identifying a lane having the counter value greater than or equal to a threshold value as a lane in which a defect occurs.

7. The operation method of claim 6, wherein the electronic device identifies a counter value corresponding to each of the plurality of lanes according to a set period.

8. The operation method of claim 1, wherein the electronic device is one of a single instruction multiple data (SIMD) processor and a single instruction multiple thread (SIMT) processor.

9. A non-transitory computer-readable recording medium comprising a program for executing the operation method according to claim 1 on a computer.

10. An electronic device comprising:

a plurality of processing lanes;

at least one additional processing lane, wherein the at least one additional processing lane comprises physical or logical circuitry having a same structure as that of the plurality of processing lanes; and a controller, wherein the controller is configured to:

identify a lane group including lanes to process identical input data among a plurality of lanes including the plurality of processing lanes and the at least one additional processing lane;

identify, for each of a plurality of lane groups, comparison result data indicating a result of comparison between processing result data of lanes included in each lane group; and detect whether a defect occurs for at least one of the plurality of lanes based on the comparison result data of the plurality of lane groups, wherein when a defect occurs for at least one of the plurality of lanes, the controller is further configured to control the at least one of the plurality of lanes in which the defect occurs to be deactivated and control input data to be processed by remaining lanes of the plurality of processing lanes or the at least one additional processing lane in which there is a lack of the defect.

11. The electronic device of claim 10, further comprising:

an input selection circuit configured to select input data to be input to each of the plurality of lanes among a plurality of input data; and an output selection circuit configured to output comparison result data of the plurality of lane groups and select a plurality of output data corresponding to the plurality of input data among processing result data of the plurality of lanes.

12. The electronic device of claim 11, wherein the input selection circuit comprises a first multiplexer configured to select input data to be identically input to each of lanes included in each lane group, and wherein the output selection circuit comprises a comparator configured to compare processing result data of lanes included in each lane group and a second multiplexer configured to select output data from processing result data of lanes included in each lane group.

13. The electronic device of claim 10, further comprising a counter corresponding to each of the plurality of lanes, wherein the comparison result data has:

a first value when lanes included in the each lane group have identical processing result data; and a second value when the lanes included in the each lane group have different processing result data, and wherein the controller is configured to:

when comparison result data has the second value, increase a counter value of a counter corresponding to each of lanes corresponding to the comparison result data; and identify a lane having the counter value greater than or equal to a threshold value to be a lane in which a defect occurs.

14. The electronic device of claim 10, further comprising an output part configured to output a signal indicating the defect occurrence when the defect is detected for the at least one of the plurality of lanes.

* * * * *